Patented June 30, 1936

2,046,249

UNITED STATES PATENT OFFICE 2,046,249

AMINOPYRENE-SULPHONIC ACIDS AND A PROCESS OF PREPARING THEM

Martin Corell, Frankfort-on-the-Main, Germany, assignor to General Aniline Works, Inc., New York, N. Y., a corporation of Delaware No Drawing. Application February 19, 1934, Serial No. 712,076. In Germany February 25, 1933

5 Claims. (Cl. 260—129)

The present invention relates to aminopyrene-sulphonic acids and to a process of preparing them.

I have found that hitherto unknown amino-pyrene-sulphonic acids are obtainable by treating 3-aminopyrene, melting at 117° C. to 118° C., with a sulphonating agent at ordinary temperature or at temperatures up to about 200° C., preferably at temperatures between 20° C. and 50° C., for instance, with an excess of sulphuric acid-monohydrate at ordinary temperature. In some cases it is of advantage that the reaction should occur in the presence of an inert organic solvent. When the sulphonation is finished the mixture is advantageously diluted with water and the aminopyrene-sulphonic acid, thus formed, is precipitated in the form of its sodium salt. An aminopyrene-sulphonic acid is likewise obtained by preparing at first the acid sulphate of 3-aminopyrene by means of the molecular amount of sulphuric acid of 66° Bé. and heating this acid sulphate, preferably in vacuo, to a higher temperature, for instance, 170° C. to 200° C. The aminopyrene-sulphonic acid, thus formed, is extracted from the reaction mass with water and isolated in the form of its sodium salt.

Aminopyrene-sulphonic acid may also be obtained by nitrating 3-pyrenesulphonic acid and reducing the nitropyrene-sulphonic acid thus formed to the corresponding aminopyrene-sulphonic acid.

A further method of preparing an aminopyrene-sulphonic acid consists in converting 3-aminopyrene into the chlorosulphonate by means of chlorosulphonic acid in the presence of an indifferent solvent and in transforming it into the aminopyrene-sulphonic acid by heating, whereby hydrochloric acid is evolved.

The aminopyrene-sulphonic acids thus obtained which correspond to the following probable formula:

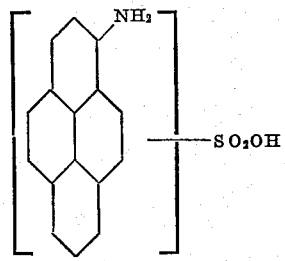

are valuable intermediate products for the production of dyestuffs.

The following examples serve to illustrate the invention, but they are not intended to limit it thereto, the parts are by weight:

(1) 20 parts of 3-aminopyrene, melting at 117° C. to 118° C., are introduced at room temperature into 200 parts of sulphuric acid-monohydrate. Thereby, the temperature rises to about 38° C. to about 40° C. After half an hour's stirring, the whole is poured on ice, impurities are filtered off and the sulphonic acid is precipitated with common salt from the solution thus obtained.

The product thus obtained which represents a mixture of probably 3-amino-8-pyrenesulphonic acid and 3-amino-10-pyrenesulphonic acid of the following constitutions:

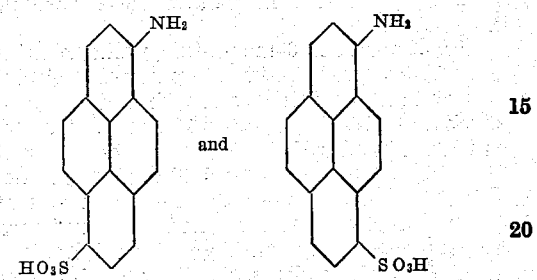

or of their sodium salts, dissolves easily in water with a strong green fluorescence and may be recrystallized from a small quantity of water.

(2) 43.4 parts of 3-aminopyrene are kneaded with 80 parts of sulphuric acid of 66° Bé. The aminopyrene-sulphate thus formed is heated in vacuo for 6 to 8 hours at 170° C. under a mercury pressure of 20–30 mm. Thereupon, the aminopyrene-sulphonic acid thus formed is extracted from the reaction mass with hot water and precipitated with common salt from the solution thus obtained. After drying, a gray-green powder is obtained which is not identical with the product obtainable according to Example 1 and dissolves only very difficultly in water to a solution having a strong blue fluorescence; most probably it represents the 3-amino-4-pyrene-sulphonic acid of the following constitution:

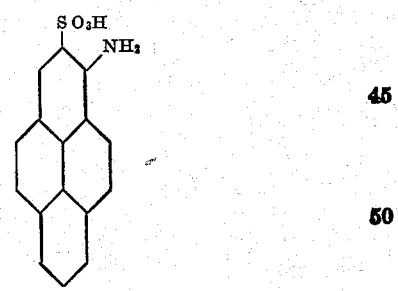

(3) 60 parts of the sodium salt of pyrenesulphonic acid, obtainable by treating pyrene in carbon tetrachloride with chlorosulphonic acid, are dissolved in 600 parts of sulphuric acid monohydrate and nitrated at 5° C. to 10° C. with 8 parts of nitric acid (specific gravity 1.5). When nearly all the nitric acid has been consumed, the whole is given on ice and the nitro-pyrene-sulphonic acid is precipitated by addition of common salt to the solution thus obtained. The sodium salt crystallizes from water in the form of small orange needles. The reduction to the aminopyrenesulphonic acid is preferably effected catalytically in the presence of water. The sulphonic acid, thus obtained, is identical with that or those obtained according to Example 1.

(4) 21.7 parts of 3-aminopyrene are dissolved in 200 parts of ortho-dichlorobenzene and, at 10° C. to 20° C., 11.7 parts of chlorosulphonic acid are added, drop by drop. The whole is stirred for a short time and then heated to boiling. When the evolution of hydrochloric acid has nearly ceased, the whole is filtered by suction and the solid residue, after being rendered alkaline by means of sodium carbonate, is distilled by means of steam. Thereby, nearly the whole becomes dissolved. After filtration, the aminopyrenesulphonic acid is isolated in the form of its sodium salt by addition of sodium chloride to the solution thus obtained. As to the constitution of the acid there can only be said that it represents a mono-aminopyrene-monosulphonic acid. Probably, it is identical with that obtainable according to Example 2.

(5) 50 parts of 3-mononitropyrene, melting at 154° C., are heated with 500 parts of a bisulphite solution of 40 per cent. strength and 200 parts of alcohol at 110° C. for about 10 hours. The whole is then diluted with water, rendered weakly alkaline, heated to boiling and filtered from the insoluble residue. From the filtrate, the aminopyrene-sulphonic acid formed is precipitated as sodium salt. The aminopyrene-sulphonic acid thus obtained is identical with that described in Example 2.

I claim:

1. The process which comprises treating at temperatures between room-temperature and about 200° C. 3-aminopyrene with a sulphonating agent.

2. The process which comprises kneading 3-aminopyrene with sulphuric acid of 66° Bé. and heating at about 170° C. for 6 to 8 hours the 3-aminopyrene-sulphate, thus obtained, at an atmospheric pressure of 20 to 30 mm. Hg.

3. The compounds of the general formula:

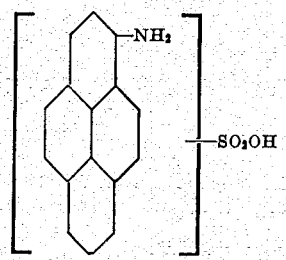

4. The compound of the formula:

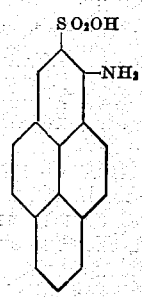

dissolving only very difficultly in water with a strong blue fluorescence.

5. The product which is obtainable by stirring 3-aminopyrene with sulphuric acid monohydrate and separating the 3-aminopyrene sulphonic acid thus obtained.

MARTIN CORELL.